United States Patent Office 3,302,713
Patented Feb. 7, 1967

3,302,713
SURFACTANT-WATERFLOODING PROCESS
George P. Ahearn and Walter W. Gale, both of Houston, Tex., assignors to Esso Production Research Company, a corporation of Delaware
No Drawing. Filed July 6, 1965, Ser. No. 469,920
23 Claims. (Cl. 166—9)

This application is a continuation-in-part of Serial No. 393,381, filed August 31, 1964, which in turn is a continuation-in-part of Serial No. 372,719, filed June 4, 1964, both now abandoned.

This invention relates to the recovery of petroleum from porous subterranean reservoirs. More particularly, the invention relates to a method for increasing the recovery of oil from such reservoirs by the injection of flood water containing an improved surfactant composition.

The petroleum industry has recognized for many years that only a small fraction of the original oil-in-place in a reservoir is expelled by natural mechanisms or primary production. It is also well known that conventional methods of supplementing natural recovery are relatively inefficient. Typically, a reservoir retains about half its original oil even after the application of currently available methods of secondary recovery. Accordingly, there is a continuing need for improved recovery methods which will substantially increase the ultimate yield of petroleum from natural reservoirs.

Waterflooding is by far the most economical and widely practiced of secondary recovery methods. Various flood water additives have been proposed in an effort to increase the efficiency of a waterflood. For example, water thickeners have been developed for the purpose of adjusting flood water viscosity in order to minimize the tendency of the water to finger ahead of the flood front. Corrosion inhibitors and bactericides have been added in order to minimize formation damage and plugging.

Surface-active agents or "surfactants" have been proposed for addition to flood water for the purpose of lowering interfacial tension between the water and the reservoir oil, thereby tending to increase the ultimate recovery of oil displaced by a waterflood. Typical surfactants which have been proposed for this purpose include alkyl pyridinium salts, sodium lauryl sulfate, certain sulfonates, glycosides, sodium oleate, quaternary ammonium salts, etc.

Various reports appear in the literature to the effect that surfactant waterflooding is capable of recovering substantial amounts of additional oil from natural reservoirs, i.e., substantially in excess of that amount which is recoverable by conventional waterflooding. Such reports indicate, at least by implication, that surfactant flooding as developed heretofore is approaching commercial success. Such reports, however, have been found to be somewhat misleading and exaggerated. Almost without exception, surfactants heretofore proposed as waterflood additives have been proven to recover no more than a few percent of the residual oil which remains in a reservoir after conventional waterflooding, when tested under conditions reasonably simulating actual field operations. In no instance has it been demonstrated heretofore that a surface-active agent is capable of increasing oil recovery, under field conditions, in sufficient amounts to offset the cost of the surfactant itself.

It is widely recognized that a low interfacial tension between the surfactant flood water and reservoir crude is essential to the improvement of recovery efficiencies. Various reports have indicated that an interfacial tension of less than 10 dynes/cm. is necessary. Others have indicated that less than 5 dynes/cm. is required. A 1% solution of a surfactant composition of the present invention in various brines, when placed in contact with "Soltrol-C" (a refined isoparaffinic oil having a boiling range of 360–395° F.) usually displays interfacial tensions below 1.0 dyne/cm. Many surfactant compositions of the invention display interfacial tensions less than 0.03 dyne/cm. This is generally indicative of an effective surfactant. However, a low interfacial tension alone is not enough. Other surfactants also display interfacial tensions of less than 1 dyne/cm. and are comparatively ineffective as waterflood additives.

It is a general object of the present invention to improve the performance of waterflooding methods for displacing oil from underground reservoirs. It is a more specific object of the invention to provide an improved waterflooding method by incorporating in the flood water minor amounts of a superior class of inexpensive surface-active agents.

The surfactants injected in accordance with the invention are prepared by sulfonating at least a portion of the sulfonatable constituents which occur in the 700–1100° F. (corrected to atmospheric pressure) boiling range fraction of a petroleum crude. Surfactants obtained by sulfonating at least a portion of the sulfonatable constituents which occur in the 850–1050° F. (corrected) boiling range are preferred. The sulfonatable constituents which occur in the 700–1100° F. boiling range are primarily hydrocarbons, including both the alkylated benzenes and the condensed ring alkylated aromatic hydrocarbons.

The average molecular weight of the sulfonatable hydrocarbons which occur in the 700–1100° F. (corrected) boiling range fraction of a petroleum crude ranges from about 350 to 600, depending upon the particular crude chosen for analysis. Various individual hydrocarbons occur in this boiling range, especially in the lower portion of the range, which have a lower molecular weight. However, the present invention is limited to the use of sulfonates prepared by sulfonating a mixture which includes a substantial proportion, preferably at least 10%, of sulfonatable aromatic hydrocarbons having a molecular weight between about 350 and 600, preferably between about 400 and 500.

The sodium salt of a monosulfonate of a hydrocarbon having a molecular weight of 350 has a molecular weight of 452. Thus, the sodium alkyl aromatic monosulfonate salts which are useful in accordance with the present invention have a molecular weight between about 450 and 700. Where the positive ion of the sulfonate is other than sodium, the molecular weight range of the invention will differ somewhat from these particular limits.

In the sulfonation of aromatic hydrocarbons, one $SO_3$ group per molecule usually appears in the product. A second $SO_3$ group can be incorporated, for example, by increasing the reaction temperature and the molar ratio of sulfonating agent. This accomplished much more readily with the condensed ring aromatics than with the single ring or benzenoid hydrocarbons. The molecular weight of a disulfonated hydrocarbon (sodium salt) is 102 greater than the corresponding monosulfonate, which shifts the molecular weight range of the invention still higher.

A sulfonated hydrocarbon having two $SO_3$ groups per molecule is generally more water-soluble or dispersible than the corresponding monosulfonated product. Since the petroleum fractions sulfonated in accordance with the invention usually contain a substantial proportion of condensed ring compounds, the solubility or dispersibility of the surfactant product in water or brine can be controlled, to a substantial degree, by controlling the extent to which disulfonation occurs in the reaction step. For example, a product which contains an average of 1.3 $SO_3$ groups per molecule is more soluble than a corresponding product which differs only in that it contains 1.1 $SO_3$ groups per molecule. It is especially significant that the more soluble components of a sulfonate mixture act to solubilize or stabilize a dispersion of the less soluble components and hence reduce adsorption significantly.

Small amounts of other sulfonatable compounds occur in this boiling range, including alkylated heterocyclic sulfur- and oxygen-containing compounds. The presence of these heterocyclics has not been found essential to the present invention; however, their presence may further enhance the surface activity of the sulfonated alkyl aromatic hydrocarbons of the invention.

The 700–1100° F. boiling range fraction of virtually all petroleum crudes is rich in sulfonatable hydrocarbons. This is especially true of the naphthenic and aromatic crudes, but is also true of paraffinic crudes. The present invention, in its broadest aspects, includes the injection of sulfonates derived from the 700–1100° F. boiling range fraction of any petroleum crude. We have found, however, that the sulfonates obtained from naphthenic crudes are far superior in their ability to displace waterflood residual oil from certain reservoirs.

Thus, in accordance with a more limited embodiment of the invention, the surfactants are prepared by sulfonating at least a portion of the sulfonatable constituents which occur in the 700–1100 F. (corrected) boiling range fraction of a petroleum crude whose 700–1100 °F. boiling range fraction has an API gravity between 18–28° at 60° F. This API gravity range includes primarily the 700–1100° F. fraction of naphthenic crudes, and also includes the same fraction of some crudes normally classified as paraffinic, but which also have naphthenic character to a substantial degree. Most aromatic crudes are excluded.

Within the 700–1100° F. boiling range fraction of any petroleum crude, a great variety of sulfonatable constituents occur, some of which yield sulfonates having a potency or ability to displace reservoir oil which differs somewhat from the potency of other sulfonates obtained from sulfonatables of the same fraction. Generally, the preferred sulfonatables occur in the 850–1050° F. fraction, although in some instances these constituents may differ only slightly from the sulfonatables boiling just below or just above this preferred range.

The surfactants of the invention may readily be prepared by the direct sulfonation of a petroleum distillate fraction having a boiling range which lies wholly or partially within the 700–1100° F. range. Such distillates include various lubricating oil distillates and the vacuum gas-oils. Preferably, the distillate should include at least a portion of the 850–1050° F. boiling range fraction. As indicated above, preferred distillates capable of yielding sulfonates which are particularly useful in accordance with the present invention, are obtained from a petroleum crude whose 700–1100° F. boiling range fraction has an API gravity between 18–28° at 60° F.

The sulfonation reaction may be carried out on a virgin distillate or on any petroleum fraction containing at least a portion of the aromatic constituents normally present in a 700–1100° F. distillate fraction. For example, extraction of such distillates with a solvent such as phenol, sulfur dioxide, furfural, sulfolane, etc., yields a raffinate phase and an extract phase, both of which contain some of the aromatic hydrocarbons of the original distillate fractions. The use of sulfonates prepared from either the extract or the raffinate phase is within the scope of the invention, since these constituents are initially present in the 700–1100° F. boiling range fraction of a petroleum crude.

In the solvent extraction of a preferred distillate, i.e., one obtained from a crude whose 700–1100° F. fraction has an API gravity between 12–28° at 60° F., a raffinate phase may be obtained which has an API gravity of more than 28° at 60° F., or an extract phase may be obtained which has an API gravity less than 18° at 60° F., or both. In any event, the injection of sulfonates obtained from either the raffinate or the extract phase falls within the scope of the preferred embodiment of the invention.

Other refining treatments to which petroleum distillates are frequently subjected, such as dewaxing or hydrofining, may yield a refined oil having an API gravity which differs substantially from the API gravity of the untreated distillate. However, the aromatic hydrocarbons or other sulfonatable constituents contained in such distillates are normally unaffected by such refining steps. Such refined distillates, because they still contain sulfonatable constituents which occur in the 700–1100° F. boiling range fraction of a petroleum crude, also yield, upon sulfonation, surfactants within the scope of the invention.

It is also within the scope of the invention to inject surfactants prepared by the direct sulfonation of a petroleum crude, provided a fraction, preferably at least 10%, of the crude boils within the 700–1100° F. range. The entire water-dispersible portion of the sulfonates produced may be injected; however, this is usually uneconomic, since the total product includes a great variety of sulfonates having a significant market value, but which contribute nothing to the oil displacement efficiency of the sulfonates derived from the 700–1100° F. fraction.

The sulfonation of hydrocarbon mixtures, and in particular the sulfonation of petroleum, has been practiced commercially for many years. Referring specifically to the sulfonation of petroleum, for example, crude oil— or a fraction thereof—is conventionally agitated with an excess of fuming sulfuric acid (oleum). When the desired degree of sulfonation has taken place, agitation is discontinued, whereupon the mixture readily separates, forming an upper layer of treated oil and a lower layer of acid sludge. The oil layer contains oil-soluble sulfonic acids which are generally known as "mahogany acids" because of the color they impart to the oil layer. The acid sludge layer, on the other hand, contains another group of sulfonic acids which are conventionally known as "green acids." The latter acids are often referred to as water-soluble sulfonic acids, although many of these acids are not truly soluble in the sense of forming a clear aqueous solution. They do, however, readily form aqueous suspensions or dispersions which may take anywhere from several hours to several days to settle to any substantial degree, or they may be permanently stable.

The water-soluble, or perhaps more accurately waterdispersible, sulfonic acids obtained from the sulfonation of at least a portion of the sulfonatable constituents which occur in the 700–1100° F. fraction of a petroleum crude are injected in accordance with one embodiment of the invention. Also, suitable surfactants are formed by neutralization of such sulfonic acids with an alkali metal hydroxide such as sodium hydroxide, ammonium hydroxide, an aliphatic or aromatic organic amine, such as propylamine, aniline, or pyridine, or an alcohol amine, such as mono-, di-, or tri-ethanol amine, etc., to give the corresponding salts. The sulfonic acids may also be neutralized with various salts, including for example sodium acetate and sodium bicarbonate. Sodium chloride may also be used. It will "neutralize" sulfonic acids to form hydrochloric acid, which is less corrosive to ordinary steel equipment. The injection of a partially neutralized mixture of acids and salts, or of acids alone, is also within the scope of the invention, since the buffering capacity of reservoir clays will readily adjust the pH to a neutral value.

A suitable procedure for preparing the surfactant composition involves a mixing of the selected petroleum fraction with fuming sulfuric acid (oleum) at a temperature below 55° C. for 1.5 hours, with agitation. When agitation is discontinued, the mixture readily separates, forming an upper layer of treated oil and a lower layer of acid sludge which contains the preferentially water-soluble sulfonic acids used in the present invention. The mixture is allowed to stand for 24 hours and then the sludge phase is dissolved in 85% aqueous isopropyl alcohol. The alcohol solution is neutralized with 50% sodium hydroxide to a pH of approximately 11. Other neutralizing agents can be used such as $NH_4OH$, KOH, LiOH, aliphatic and aromatic organic amines such as propylamine, aniline, pyridine, alcohol amines such as mono-, di-, triethanol amines, to give the corresponding salt. The water and alcohol are then removed by evaporation, which yields a solid residue consisting essentially of petroleum sulfonates and sodium sulfate (in the case of neutralization with NaOH). This mixture may be injected in accordance with the invention; i.e., desalting is not required.

If desired, the petroleum sulfonates may be dissolved in absolute ethanol, which leaves the sodium sulfate behind in the solid phase. Ethanol is then flashed off, leaving a residue of purified petroleum sulfonates for use in accordance with the invention. The surfactant compositions thus produced may contain appreciable amounts of materials, in addition to sulfonated hydrocarbons, which can play an important role in the process of the invention. These reaction conditions are typical and are subject to variations or modifications known to those experienced in the art.

Essentially all vacuum gas-oil fractions contain substantial amounts of sulfonatable aromatics. All such sulfonates are highly surface-active, but they have a wide range of efficiencies when used in accordance with the present invention. However, the aromatic hydrocarbons present in the petroleum fractions of the preferred embodiment differ unexpectedly from the aromatics contained in the corresponding fractions obtained from other types of petroleum crudes. The API gravity of the 700–1100° F. fraction is a useful measure of this difference and is an essential feature of the preferred embodiment. Thus, it has been found that vacuum gas-oil fractions of a petroleum crude whose 700–1100° F. fraction has an API gravity greater than 28°, or less than 18° at 60° F., do not yield, on sulfonation, a surfactant composition which is as efficient in the displacement of residual oil as are the compositions of the preferred embodiment. This distinction is not related merely to the concentration of aromatics found in the various different 700–1100° F. distillate fractions. It may instead be related to differences in the proportions of the various types of aromatic hydrocarbons (single-ring and condensed rings) found within this boiling range, and the degree and nature of their alkylation, which directly contributes to their inherent surface activity.

Comparative data which illustrates the foregoing appears in Table I. Bachaquero crude from Venezuela, a blend of naphthenic petroleum crudes from the Texas Gulf Coast, and a paraffinic Panhandle crude were separately distilled to obtain vacuum gas-oil cuts boiling within the range of 800–1000° F., and having API gravities at 60° F. of about 16°, 21° and 30°, respectively. These cuts were separately sulfonated and the sodium salts obtained in accordance with the above procedure. The surfactants obtained were employed in separate, identical oil displacement tests, wherein 1% aqueous surfactant solutions containing an optimum concentration of NaCl were injected into one end of 6-inch-by-1-inch Torpedo sandstone cores which had been flushed with NaCl brine, saturated with Loudon crude oil, and then reduced to waterflood residual oil saturation by flooding with sodium chloride brine. A constant pressure gradient of 1.0 p.s.i./ft. was employed in each surfactant flood. The distillate sulfonates from the Panhandle and Bachaquero crude recovered about 20% of the residual oil, compared with 74% of the residual oil recovered with the sulfonate of the naphthenic distillate, after 5.0 pore volumes of surfactant injection.

TABLE I

| Pore Volumes Sulfonate Solution Injected | Volume Percent Residual Oil Recovered by Gas-Oil Sulfonates | | |
|---|---|---|---|
| | Bachaquero Distillate (16° API) | Gulf Coast Distillate (21° API) | Panhandle Distillate (30° API) |
| 1 | 5 | 16 | 0 |
| 2 | 14 | 44 | 5 |
| 3 | 17 | 61 | 12 |
| 4 | 20 | 69 | 16 |
| 5 | 22 | 74 | 20 |

Suitable concentrations of surfactants in the flood water of a displacement operation range from 0.01% by weight up to 5% or more, depending upon the effectiveness of the particular surfactant being used. The upper limit of this range is usually determined by the solubility of the material in a field brine, and by the fact that the use of larger concentrations is economically less attractive. The addition of surfactant to the flood water may be continuous or intermittent without departing from the scope of the invention.

The surface-active character and oil displacement efficiency of the aqueous sulfonate solutions of the invention are substantially enhanced by incorporating therein small amounts of water-soluble salts. As little as 0.1 weight percent sodium chloride, for example, markedly improves the surface activity of the water-soulfonate mixture. Potassium, ammonium, and other soluble salts are also effective. Preferred concentrations of NaCl used are between 0.5% and 5.0% and preferably about 2% to 3%. Salt concentrations in excess of about 10% become detrimental, since they tend to "salt-out" the surfactant from the aqueous medium, thereby considerably reducing the effective concentration of surfactant at the flood front, and rendering it less efficient.

The presence of calcium and other polyvalent cations in the water-surfactant mixtures of the invention is undesirable and should be avoided altogether when possible. When this is not feasible, the flood water should be appropriately treated so as to reduce the concentration of these ions. Amounts of these polyvalent ions in excess of 500 parts per million cannot usually be tolerated. However, it may be possible to find sulfonate compositions which can tolerate polyvalent ion concentrations which greatly exceed this limit.

The effect of brine concentration on oil recovery efficiency is shown in Table II which relates oil recovery, as a function of sodium ion concentration, with calcium ion concentration as an additional parameter. Each data point represents the average of three oil displacement tests in a 6-inch-by-1-inch Torpedo sandstone core which has been flushed with the indicated brine solution, saturated with a Mid-Continent crude oil, and waterflooded to a residual oil saturation. A 1% solution of petroleum sulfonates obtained from an 850–1050° F. cut of a naphthenic crude was then continuously injected into the core at a constant pressure gradient of 1.0 p.s.i./ft. Each point shows the percent of the residual oil recovered after three pore volumes of surfactant solution was injected. In the following table, it is noted that very small concentrations of calcium ions at relatively low sodium ion concentrations are actually somewhat beneficial. This might appear to conflict with the statement made earlier herein to the effect that calcium ions are generally undesirable. There is actually no inconsistency, however, since the concentration of sodium ions at which the calcium ions are beneficial is far below the sodium ion concentration considered optimum for the system treated in this table. The addition of further amounts of $Ca^{++}$ ions to solutions containing large amounts of Na+ ions prevents the formation of a stable surfactant suspension.

TABLE II

| Na+ Concentration, p.p.m. | Ca++ Concentration, p.p.m. | Volume Percent Residual Oil Recovery |
|---|---|---|
| 2,000 | 0 | 8 |
| 4,000 | 0 | 30 |
| 6,000 | 0 | 63 |
| 8,000 | 0 | 54 |
| 10,000 | 0 | 33 |
| 3,000 | 50 | 28 |
| 4,000 | 50 | 47 |
| 2,000 | 75 | 40 |
| 1,000 | 150 | 20 |

It is apparent from these data that the various surfactants which fall within the scope of the invention will have different oil recovery efficiencies, depending upon the brine compositions in which they are dissolved or dispersed. Within the stated range of brine concentrations, the stronger brines should be used only in combination with petroleum sulfonates obtained from a distillate boiling within the lower portion of the useful range or having a higher degree of sulfonation. The presence of calcium and other polyvalent ions should be avoided to the extent possible when using petroleum sulfonates prepared from a distillate boiling within the upper portion of the useful range.

Maximum recovery efficiencies are obtained by adjusting the salt content of the brine-surfactant solution to a level great enough to cause it to be at least slightly turbid or cloudy. Mixtures or solutions which are cloudy prior to injection into an oil-bearing rock or sand are generally superior in oil-recovery effectiveness to solutions or mixtures which are not cloudy. A solution which is cloudy at room temperature may be much less turbid at the elevated temperatures of some reservoirs. Extreme cloudiness, therefore, may be desirable at temperatures below reservoir temperatures. Even though such cloudiness may result in slight precipitation over long standing, such precipitates have not been found detrimental to oil recovery; indeed, they appear to enhance it.

It appears from the foregoing that the temperature of a surfactant solution is an important factor relative to the above-listed properties; and the optimum brine limits which have been measured at room temperature, for example, will probably differ from those at reservoir conditions. Generally, the surfactants of the invention are more soluble at elevated temperatures, and the tolerable brine limits are therefore increased. It is also contemplated that sulfonates derived from hydrocarbon mixtures boiling in the upper portions of the ranges mentioned above may be preferred at elevated temperatures. In this regard, it is possible that sulfonates derived from fractions boiling somewhat above these ranges may be found satisfactory for use. It is desirable, therefore, to take these and other known factors into consideration in actual field applications.

The amount of sulfonate surfactant to use in a given oil recovery operation may vary considerably, depending upon factors such as the salt content of the water employed, the type of oil, the nature of the oil-bearing formation, and the ability of the surfactant to reduce the interfacial tension between the oil and the flood water. The concentration may be governed to a degree, depending on whether the surfactant is to be added to the flood water continuously throughout the oil recovery operations, or whether it is to be added in aqueous slugs or banks. Thus, the concentration of surfactant, when continuously injected throughout a recovery operation, will normally be less than when a slug or bank is employed.

When continuously injecting a sulfonate surfactant throughout an oil recovery operation—as, for example, a waterflood—surfactant concentrations of about 1.0% by weight of the aqueous component will normally be used. When injected in the form of concentrated banks, on the other hand, concentrations may range up to the limits of the sulfonate that can be dispersed in the aqueous medium. In other words, the concentration of the sulfonate should never be so great as to interfere with the injection of the flood water into a formation.

While the present invention is directed primarily toward the recovery of oil from subterranean oil-bearing formations through an improved water-flooding technique, it will be recognized that the invention is not limited to such application. For example, the potential of the invention in the recovery of oil from tar sands, such as the Athabasca tar sands, is very promising. It is possible in this particular application to contact sands which have been removed from a subsurface deposit to the surface and then contact the sands with aqueous surfactant solutions. The solutions may be heated to elevated temperatures to improve their oil-stripping ability.

It is also possible to recover oil from tar sands directly in situ. Aqueous surfactant solutions, for example, may be pumped down wells so as to contact the sands. Lateral communication can be established through the sands between spaced wells, as by fracturing, and the aqueous surfactant solutions or dispersions circulated between the wells. The solutions are preferably heated and may be injected concurrently or intermittently with steam.

In addition, the surfactants of the present invention can be readily applied to other reservoirs containing highly viscous oil, by injecting heated solutions in a continuous or intermittent manner.

Materials not incompatible with the practice of the invention may be added to the surfactant solutions. Water-soluble thickeners are potentially very attractive for use in combination with the surfactants disclosed herein for displacing oils which are more viscous than water from oil-bearing deposits. A number of materials have been previously suggested as water thickeners, including water-soluble polyacrylamides, polyacrylates, and sulfonated vinyl aromatic polymers, colloidal clay, etc. Particularly attractive water thickeners are water-soluble biopolymers such as dextran, and especially polymers of the type described in Canadian Patent No. 654,809, issued on December 25, 1962, and entitled, "Displacement of Oil From Partially Depleted Reservoirs." Generally speaking, one percent or less of a water-soluble thickener is sufficient to increase the viscosity of an aqueous surfactant solution of this invention to the extent desired. In connection with the use of thickened water, it is possible to drive alternate slugs of thickened water and surfactant solutions through an oil reservoir. A particularly attractive arrangement is to inject a bank of a surfactant mixture or solution into a reservoir and to follow it with a bank of thickened water solution.

Small amounts of materials such as bactericides, rust preventives, colloidal dispersants, solubilizers, chelating agents, water-softening agents, and the like may also be used in the practice of the invention.

With regard to the manner of preparing the sulfonates used in the practice of the invention, sulfonating agents other than oleum may be used as desired. Sulfur trioxide, for example, may be used so as to minimize the formation of mineral salts otherwise produced when the resulting sulfonic acids are neutralized with materials such as sodium hydroxide and potassium hydroxide. In those instances where a petroleum fraction is sulfonated, the fraction may be a straight-run virgin fraction, or it may be a treated fraction such as a dewaxed or solvent extracted fraction. There is evidence to indicate that certain preliminary treatment of petroleum fractions— and, in particular, dewaxing and solvent extraction— greatly and unexpectedly enhance the sulfonates for the purposes of the invention.

This description of the present invention has been concerned in the main with so-called secondary and tertiary methods of oil recovery. It should be noted that it also has application to primary methods of oil recovery as, for example, in the case of a flank or bottom water drive. In such a case, aqueous surfactant solutions may be injected into a reservoir substantially at the point of water and oil contact. Injection into the oil zone of the oil-water interface, however, would also be desirable from the standpoint of having the surfactant in position in time for the advancing water front to tank advantage of the benefits provided by the surfactant.

Highly fractured reservoirs—i.e., reservoirs characterized by marked capillary differences—are especially suitable for application of the methods of this invention.

*Example I*

A surfactant composition is prepared by reacting 20% oleum with a distillate obtained from a blend of Texas Gulf Coast naphthenic petroleum crudes. The distillate has a boiling range of about 800–1000° F. and an average molecular weight of 468. The reactants are passed through an orifice plate mixer at a rate which corresponds to an average reaction time of about 3.0 seconds. The reaction effluent is immediately neutralized by admixture with a slight excess of NaOH dissolved in 50% aqueous isopropanol. The neutralized mixture stratifies on standing, with the formation of three layers: an upper layer of unreacted oil, a middle layer of aqueous isopropanol containing water-dispersible sulfonates, plus a bottom layer of saturated brine containing undissolved $Na_2SO_4$ and minor amounts of other salts. The surfactant composition is recovered from the middle layer by evaporating most of the alcohol and water. Flood water containing 1% by weight of the surfactant is thereafter injected into a petroleum reservoir in accordance with the invention.

*Example II*

A surfactant composition is prepared by reacting $So_3$ with an aromatic extract obtained by phenol extraction of a hydrofined distillate fraction (850–1050° F., corrected) produced by the vacuum distillation of a naphthenic petroleum crude recovered from a Texas Gulf Coast reservoir. The extract, which has an average molecular weight of 400, is first blended with an equal volume of 1,2-dichloroethane. A stream of dilute gaseous $SO_3$ (8% by volume) in air is then passed into the blend until about one mol of $SO_3$ has been added per mol of sulfonatable hydrocarbon in the extract. The reaction mixture is then neutralized by admixture with a slight excess of NaOH dissolved in 50% aqueous isopropanol. The neutralized mixture stratifies on standing, as in Example I, with the exception that the bottom layer contains much less salt. The major proportion of salt which results in Example I comes from the neutralization of $H_2SO_4$. Thus, one advantage of using $SO_3$ is the reduced amount of base required to neutralize the reaction mixture. As in Example I, the surfactant composition to be injected in accordance with the invention is contained in the middle layer. It is recovered by evaporating most of the dichloroethane and isopropanol. The surfactant is then added to a stream of flood water (1% by weight) and injected into the reservoir.

*Example III*

Crude oil from the Webster field of southeast Texas is pretreated with 20% oleum, using one volume of oleum for each thirty volumes of crude. The sludge produced by the pretreatment is discarded, and the remaining oil is sulfonated by agitation for about five seconds with 65% oleum, using one volume of oleum for each five volumes of pretreated crude. The reaction mixture is then neutralized by admixture with a slight molar excess of ammonium hydroxide. The aqueous layer, which contains the organic sulfonates plus inorganic ammonium salts, is separated from the oil layer and is added to a stream of flood water for injection into the reservoir.

*Example IV*

A petroluem distillate having a 700–1100° F. boiling range (corrected) is contacted with furfural to produce an aromatic extract and a first raffinate phase. The extract phase is contacted with water to produce a second raffinate and a final extract. The second raffinate is blended with an equal volume of liquid $SO_2$. Liquid $SO_3$ (trimer) is slowly added to the blend, with stirring, until about 1.5 mol of $SO_3$ is added per mol of sulfonatable hydrocarbon in the blend. The resulting mixture is neutralized with diethylamine. The organic sulfonates are separated and injected into the reservoir as a one percent (1%) solution by weight.

What is claimed is:

1. A method for the recovery of oil from a subterranean reservoir which comprises injecting a surfactant into the reservoir and producing oil displaced by said surfactant, said surfactant comprising a water-dispersible product obtained by sulfonating at least a portion of the sulfonatable constituents which occur in the 700–1100° F. (corrected) boiling range fraction of a petroleum crude.

2. A method as defined by claim 1 wherein said surfactant is prepared by sulfonating a petroleum distillate fraction having an average molecular weight between 350 and 600.

3. A method as defined by claim 1 wherein said surfactant is prepared by the direct sulfonation of a petroleum crude.

4. A method as defined by claim 1 wherein said sulfonating step produces aromatic sulfonic acids, and said acids are injected into the reservoir.

5. A method as defined by claim 1 wherein said sulfonating step produces aromatic sulfonic acids; wherein said acids are neutralized by reaction with a base to produce a mixture of aromatic sulfonates and inorganic salt; and wherein said mixture is injected into the reservoir.

6. A method for the recovery of oil from a subterranean reservoir which comprises injecting a surfactant into the reservoir and producing oil displaced by said surfactant, said surfactant comprising a water-dispersible product obtained by sulfonating at least a portion of the sulfonatable constituents which occur in the 700–1100° F. boiling range fraction of a petroleum crude whose 700–1100° F. boiling range fraction has an API gravity between 18° and 28° at 60° F.

7. A method as defined by claim 6 wherein the surfactant is obtained by reacting said sulfonatable constituents with oleum to produce a sulfuric acid sludge containing sulfonic acids, followed by the step of at least partially neutralizing said sulfonic acids with a base selected from the group consisting of the alkali metal hydroxides and ammonium hydroxide.

8. A method as defined by claim 6 wherein said surfactant is obtained by the reaction of said sulfonatable constituents with oleum, followed by the step of at least partially neutralizing the resultant sulfonic acids with a base selected from the group consisting of aliphatic and aromatic amines.

9. A method as defined by claim 6 wherein said surfactant is obtained by reacting said sulfonatable constituents with oleum, followed by the step of at least partially neutralizing the resultant sulfonic acids with a base selected from the group consisting of mono-, di-, and trialkanol amines.

10. A method as defined by claim 6 wherein said surfactant is prepared by the sulfonation of a petroleum crude with $SO_3$.

11. A method as defined by claim 6 wherein said surfactant comprises sulfonate salts obtained by at least partial neutralization of the sulfonic acids produced by reacting a petroleum distillate with fuming sulfuric acid.

12. A method as defined by claim 6 wherein said surfactant is prepared by at least partially neutralizing the sulfonic acids produced by the reaction of oleum with an aromatic extract of a petroleum distillate fraction, and wherein said extract has an average molecular weight between 350 and 600.

13. A method for recovery of oil from a subterranean reservoir which comprises injecting a surfactant into the reservoir and producing reservoir oil displaced by said surfactant, said surfactant comprising a mixture of petroleum sulfonates obtained from the acid sludge prepared by reacting oleum with a petroleum distillate which contains sulfonatable hydrocarbons from the 700–1100° F. boiling range fraction of a petroleum crude whose 700–1100° F. boiling range fraction has an API gravity between 18° and 28° at 60° F.

14. A method as defined by claim 13 wherein said petroleum distillate has been dewaxed prior to sulfonation.

15. A method as defined by claim 13 wherein said petroleum distillate has been hydrofined prior to sulfonation.

16. A method for the recovery of oil from an oil-bearing formation which comprises contacting at least a portion of said formation with water containing a minor proportion of water-dispersible petroleum sulfonate salts of a cation selected from the group consisting of the ammonium and alkali metal ions, said sulfonates being obtained from the neutralization of acid-soluble sulfonic acids produced by contacting $SO_3$ with at least a portion of the aromatic constituents which occur in the 700–1100° F. boiling range fraction of a petroleum crude whose 700–1100° F. boiling range fraction has an API gravity between 18° and 28° at 60° F.

17. A method as defined by claim 16 wherein said water contains between 1,000 and 10,000 parts per million of dissolved monovalent cations in addition to the cations of said sulfonates.

18. A method as defined by claim 16 wherein said sulfonate-containing water is followed by water containing a soluble thickening agent.

19. A method for the recovery of oil from a subterranean reservoir which comprises injecting a surfactant into the reservoir and producing oil displaced by said surfactant, said surfactant comprising a water-dispersible product obtained by sulfonating at least a portion of the sulfonatable constituents which occur in the 700–1100° F. (corrected) boiling range fraction of a petroleum crude, and adjusting the ionic strength of the flood water to obtain maximum oil recovery.

20. A method for the recovery of oil from a subterranean reservoir which comprises injecting a surfactant into the reservoir and producing oil displaced by said surfactant, said surfactant comprising a water-dispersible product obtained by sulfonating at least a portion of the sulfonatable constituents which occur in the 700–1100° F. (corrected) boiling range fraction of a petroleum crude, and controlling the number of $SO_3$ groups per molecule contained in said sulfonate product, to obtain optimum brine compatibility.

21. A method for the recovery of oil from a subterranean reservoir which comprises injecting a surfactant into the reservoir and producing oil displaced therefrom, said surfactant comprising a water-dispersible product obtained by sulfonating a portion of the sulfonatable constituents which occur in the 700–1100° F. (corrected) boiling range fraction of a petroleum crude, said sulfonatable constituents having an average molecular weight between 350 and 600.

22. A method for the recovery of oil from a subterranean reservoir which comprises injecting an aqueous surfactant-containing composition into the reservoir and producing oil displaced therefrom, said surfactant comprising a water-dispersible product obtained by sulfonating at least a portion of the sulfonatable constituents which occur in the 700–1100° F. (corrected) boiling range fraction of a petroleum crude, the concentration of surfactant in the injected composition being sufficient to mobilize and displace a substantial amount of waterflood residual oil from the reservoir.

23. A method as defined by claim 22 wherein the concentration of surfactant in said composition is at least about one percent (1%) by weight.

References Cited by the Examiner

UNITED STATES PATENTS

| | | | |
|---|---|---|---|
| Re. 23,360 | 4/1951 | Berl | 252—8.55 |
| 2,197,800 | 4/1940 | Henke et al. | 252—8.55 |
| 2,808,109 | 10/1957 | Kirk | 252—8.55 |
| 2,839,466 | 6/1958 | Shock et al. | 166—9 X |
| 3,126,952 | 3/1964 | Jones | 166—9 |
| 3,167,119 | 1/1965 | Meadors | 166—9 |

CHARLES E. O'CONNELL, *Primary Examiner.*

S. J. NOVOSAD, *Assistant Examiner.*